UNITED STATES PATENT OFFICE.

WILLIAM H. JENNENS, OF KANSAS CITY, MISSOURI.

COMPOSITION FOR ARTIFICIAL STONE AND PROCESS OF MIXING SAME.

SPECIFICATION forming part of Letters Patent No. 549,133, dated November 5, 1895.

Application filed December 31, 1894. Serial No. 533,498. (No specimens.)

*To all whom it may concern:*

Be it known that I, WILLIAM H. JENNENS, a citizen of the United States, residing at Kansas City, in the county of Jackson and State of Missouri, have invented a certain new and useful Composition of Matter for the Manufacture of Artificial Stone and the Process of Mixing the Same; and I do hereby declare that the following is a full, clear, and exact description thereof.

My invention has for its object a bituminous plaster which will possess the qualities in a high degree of elasticity, non-absorption, and density in integral formation, and which will not disintegrate from exposure to climatic influences.

My invention is particularly applicable in the construction of artificial or molded window-caps, capitals, bases, and exterior decoration of buildings and wherever durability is required in the material.

The various steps in carrying out my invention are as follows: I take calcium sulphate and gage it by the addition of water until the required consistency is obtained. With this solution is mixed an amount of fiber, such as animal-hair, sufficient to obtain the bond throughout the material. After the material has crystallized, or, as commonly termed, "set," the fibrous material is then subjected to heat and the superfluous water is driven off of the fibrous material thus obtained. A solution is next made as follows: rosin-varnish, forty per cent.; linseed-oil, ten per cent.; asphalt-varnish, five per cent.; yellow ocher, five per cent.; gasoline, forty per cent. The linseed-oil is first placed in a deep vessel and the other mentioned ingredients are added one after another, a constant stirring being given the mixture as each ingredient is added. Ten per cent. of the above solution is then placed in a deep vessel. Ninety per cent. of the fibrous material heretofore mentioned in its dry state is immediately immersed within the bituminous solution, as described, and the gasoline in which the asphalt-varnish is soluble permeates the fibrous plaster material, carrying with it the asphalt and rosin varnishes, linseed-oil, and ocher, which is absorbed by the fibrous plaster material and becomes a component part thereof. The fibrous material absorbs ten per cent. of the solution; but the proportions are varied according to the density of the fibrous material. The bituminized fibrous plaster material is then removed from the vessel and permitted to dry. The product thus obtained is dark in color and sonorous when struck with hard substances.

The advantages of the material are such as to present a surface upon which paint may be laid without saponifying the oil in the paint and upon which the action of the weather will have no effect.

Two effects are thus obtained. The gasoline gradually evaporates in the process of drying and the bituminized fibrous material becomes hard and suitable for use and the exterior of the material possesses a varnished surface which resists the action of water, and the character of the material, instead of being brittle, is rendered more elastic by the union of the oil and asphalt and rosin varnishes. Instead of the gasoline, benzine or turpentine may be employed. For the yellow ocher other well-known fillers may be used.

Many attempts have been made to make plastic material impervious to atmospheric influences with linseed-oil, with the results that the oil is saponified with the free alkali of the plaster material and leaves an insecure ground for paints.

Having fully described my invention, what I now claim as new, and desire to secure by Letters Patent, is—

1. The method of mixing ingredients for an artificial stone, consisting first in gaging calcium sulphate in water, driving off the superfluous water after crystallization then adding to the plastic material a solution composed of asphalt varnish and rosin varnish the said varnishes being first reduced in gasoline, in the proportions substantially as described.

2. The method of mixing ingredients for an artificial stone, consisting first in gaging calcium sulphate, fiber and water, then driving off the water after crystallization, then adding a solution consisting of asphalt varnish, linseed oil, rosin varnish, ocher and gasoline in the proportions substantially as described.

3. A composition consisting of calcium sulphate, fiber, and asphalt varnish, rosin varnish, ocher, linseed oil and gasoline, the varnishes and oil being soluble in gasoline in the proportions substantially as described.

WILLIAM H. JENNENS.

Witnesses:
WM. WATSON,
S. L. C. HASSON.